United States Patent [19]

Balon

[11] 4,089,101
[45] May 16, 1978

[54] METHOD OF FORMING A FLUID SEAL BETWEEN A TUBE AND FITTING

[76] Inventor: Albert J. Balon, 9717 Greenhaven Pkwy., Brecksville, Ohio 44136

[21] Appl. No.: 528,160

[22] Filed: Nov. 29, 1974

Related U.S. Application Data

[60] Division of Ser. No. 415,551, Nov. 14, 1973, Pat. No. 3,940,168, which is a continuation-in-part of Ser. No. 378,318, Jul. 11, 1973, Pat. No. 3,942,825.

[51] Int. Cl.² .................. B21D 39/00; B23P 11/02
[52] U.S. Cl. .................... 29/523; 285/382.5
[58] Field of Search .............. 29/157 R, 505, 512, 29/523, DIG. 43; 285/382.4, 382.5, 132, 137 R, 382, 222, 334.4

[56] References Cited

U.S. PATENT DOCUMENTS

| | | | |
|---|---|---|---|
| 528,167 | 10/1894 | Jones | 285/382.5 |
| 609,030 | 8/1898 | Keller | 285/382.5 |
| 1,754,922 | 4/1930 | Weldon | 29/DIG. 43 |
| 1,817,854 | 8/1931 | Sorenson | 285/382.5 |
| 1,859,972 | 5/1932 | Key | 285/382.5 |
| 1,971,117 | 8/1934 | Mossberg | 29/523 |
| 2,160,263 | 5/1939 | Fletcher | 29/DIG. 43 |
| 2,434,080 | 1/1948 | Rosa | 29/523 X |
| 2,463,883 | 3/1949 | Kinsey | 285/382.5 |
| 2,469,851 | 5/1949 | Stecher et al. | 285/382.5 |
| 2,477,676 | 8/1949 | Woodling | 29/512 |
| 2,553,981 | 5/1951 | Richardson | 285/382.5 X |
| 2,779,279 | 1/1957 | Maiwurm | 285/382.5 X |
| 3,092,404 | 6/1963 | MacWilliam | 285/334.4 |
| 3,428,338 | 2/1969 | Corwin | 29/523 X |
| 3,497,946 | 3/1970 | Tingley | 285/382.5 X |
| 3,534,988 | 10/1970 | Lindsey | 29/523 X |
| 3,687,495 | 8/1972 | Sakamoto | 285/382.5 X |
| 3,778,090 | 12/1973 | Tobin | 285/382.5 X |
| 3,787,945 | 1/1974 | Pasek et al. | 29/523 |

FOREIGN PATENT DOCUMENTS

| | | | |
|---|---|---|---|
| 683,803 | 12/1966 | Belgium | 285/382.4 |
| 236,308 | 7/1925 | United Kingdom | 285/222 |

*Primary Examiner*—Charlie T. Moon
*Attorney, Agent, or Firm*—Cain and Henn

[57] ABSTRACT

A structure for providing a high pressure, fluidtight juncture between a tube or tubing and a fitting or body member in which a bore is provided in the fitting. The bore has a non-circular interior wall adjacent its opening and a threaded wall of lesser diameter interiorly of said non-circular portion. The tube has threads at or near one end which engage the threads of the bore. In addition, the tube is upset or displaced axially with the said end held against movement to flow the tubing into fluidtight sealing engagement with the threads, the non-circular portion of the bore and the transverse or lateral wall portion of the bore wall intermediate said threaded and non-circular portion, and with the exterior surface of the fitting at the bore opening. The invention also comprehends the method of making such a structure as set forth so that the tube and fitting resists relative movement tending to break the reel, either from direct outwardly pull axially of the bore or by torque applied to the tube and such a structure which is in and is useful in and as a part of a pilot light harness for gas stoves, and the like.

5 Claims, 11 Drawing Figures

METHOD OF FORMING A FLUID SEAL BETWEEN A TUBE AND FITTING

CROSS-REFERENCE TO RELATED APPLICATIONS

This application is a division of Applicant's copending application Ser. No. 415,551 filed Nov. 14, 1973, now U.S. Pat. No. 3,940,168, which is, in turn, a continuation-in-part of applicant's copending application Ser. No. 378,318 filed July 11, 1973, now U.S. Pat. No. 3,942,825.

BACKGROUND OF THE INVENTION

This invention relates to a method and structure by which a tubular member or part is connected, plug and socket like, in a high torque and pull resistant, fluidtight engagement with a fitting or other body member. Such assemblies of tube and fitting, and the like, have a wide range of uses, including use in relation to gas stoves.

More particularly, this invention also relates to a new and improved pilot light harness comprising an assembly of a pilot light gas supply tube (hereinafter referred to as a "pilot tube"), one end of which is sealingly inserted in a pilot tube manifold or fitting, and which has disposed on the other end a fitting or structure to ensure a steady pilot flame. Conventionally, a single manifold supplies two pilot tubes, though a single pilot tube or several pilot tubes may be supplied from a pilot tube manifold.

Gas stoves of the type that are commonly used in kitchens for cooking purposes, are provided with burners which are conveniently lighted by flashing or projecting a normally restricted pilot flame, through a flash tube. One end of the flash tube is disposed next to the pilot flame, and the other end is disposed near the burner so as to place the burner in flame communication with the pilot flame, enabling gas issuing from the burner to be ignited. Typically, the pilot flame burns continuously, and will ignite any flammable gas reaching it. Thus, it is of utmost importance that there be no gas leaks from any portion of the gas supply system to the stove. In particular, because normally there is a continuous flow of gas through a pilot tube manifold and the one or more pilot tubes emanating from the manifold, it is necessary to effect a reliable and rugged gastight seal between each pilot tube and the manifold. Ruggedness of the seal is desirable for two reasons: the pilot harness may be handled roughly when it is fitted into a stove, or at some point during the manufacture of the stove, and the pilot harness is likely to be roughly contacted on occasions when the stove is in use as it is being thoroughly cleaned.

Prior art devices to seal the pilot tube in flow communication with a source of gas include a valve and coupling such as disclosed in U.S. Pat. No. 3,527,410. Such a valve may include a single fitting extending axially from the end of a pilot tube and obviating the need for a separate coupling and valve mechanism, without leakage or similar danger. However, where economics preclude the use of a valve such as is disclosed in the aforementioned patent, it is desirable to sealingly insert a pilot tube into a manifold directly, without benefit of a valve. Such a seal has been effected by slidingly inserting a pilot tube into a recess in a pilot tube manifold and exerting sufficient pressure on the manifold immediately surrounding the pilot tube so as to work the metal in the manifold against the cylindrical surface of the pilot tube, compressing the tube inwardly thus effecting a seal. A seal has also been effected by press-fitting a pilot tube into a recess having a diameter no larger than the tube, and usually, sufficiently smaller than the tube to work, or pare, or shave back enough metal around the tube to effect a seal.

Seals effected as described immediately hereinabove have resulted in a frangible seal, that is, a seal which will not withstand rough handling even if it is not easily disrupted. The risks of utilizing seals such as these have been deemed undue by certain governmental agencies. There is, therefore, a need for supplying an inexpensive pilot light harness in which the tubes are sealingly inserted in a pilot light manifold to form a rugged seal.

It is also obvious that such a structure whereby a tube and fitting can be formed into a fluidtight juncture which resists disjuncture due to axial or torque forces or because of return of the metal of the juncture to normalcy due to environmental or other causes following the imposition of surface and related stresses during formation of the juncture has the potential of a wide range of uses and applications beyond that in a pilot light harness.

SUMMARY OF THE INVENTION

It is, therefore, a general object of this invention to provide a new and improved juncture structure between a tube or tubing and a fitting or body member and to provide a new and improved method for making such a juncture.

It is a further object of this invention to provide a new and improved juncture for a tube or tubing and a fitting or body member which is gas or fluidtight and which resists loosening by large axial and/or torque forces, as well as such forces which are less than that necessary to destroy the tube or tubing and to provide a method for making such a juncture.

A still further object of this invention includes the provision of a new and improved gas or fluidtight juncture between a tube or tubing and a fitting or body member wherein the aging effect of the metal during use, following the stress of assembly and manufacture, will increase rather than decrease the effectiveness of the seal.

Another general object of this invention is to provide a new and improved pilot light harness for gas stoves, and the like, including a novel and unique seal for a pilot tube in a pilot tube manifold, or fitting.

Still another general object of this invention is to provide a direct seal with metal-to-metal contact of a pilot tube, or the like, within and around a recess in a pilot tube manifold, or the like, so as to effect a gastight seal between the tube and manifold.

It is a particular object of this invention to provide a gastight seal around a pilot tube, and the like, which is inserted in a pilot tube manifold, and the like, and which is thereafter axially forced against the manifold, or the like, with sufficient force to form a sealing bead around the pilot tube, or the like.

It is another particular object of this invention to provide a metal-to-metal gastight seal around a pilot tube, one end of which is slidably inserted in a recess of a pilot tube manifold and subjected to an axial force sufficient to effect relative movement between the pilot tube and the pilot tube manifold in such a manner as to circumferentially enlarge the portion of the tube within the recess against the wall of the recess, and to form a gastight, circumferential sealing bead around the pilot tube, to seal the periphery of the recess in the pilot tube manifold.

It is a still more specific object of this invention to provide tangentially contiguous gastight sealing beads on at least two pilot tubes, or the like, proximately disposed in a pilot tube manifold, fitting, or body member to prevent relative rotation of one pilot light tube, or the like, which respect to the other at the surface of the manifold, fitting or body member.

It is yet another specific object of this invention to provide a gastight sealing bead on a pilot tube, or the like, slidingly or otherwise inserted in a fitting, or the like.

It is a further specific object of this invention to provide a process for sealing an end of a pilot tube by forming a circumferential sealing bead near the end, around a recess in a manifold or fitting in which the pilot tube is inserted with a close sliding fit.

Still other objects of this invention include the provision of a new and improved juncture and gas or fluidtight seal between a tube or tubing and a fitting or body member in which the tubing is positively held against axial and/or rotational movement relative to the fitting or body member; the provision of such a juncture and gas or fluidtight seal in which the tube or tubing is threadably engaged within the fitting or body member; the provision of such a juncture and gas or fluidtight seal in which the tube or tubing is compressed and distorted into sending engagement with a bore, or the like, in the fitting or body member; the provision of such a juncture and gas or fluidtight seal having sealing engagement between the tube or tubing and fitting or body member externally of the fitting or body member and about a bore or recess in which the tube or tubing is disposed; and the provision of such a juncture and gas or fluidtight seal in which the tube or tubing is disposed within a bore in the fitting or body member at least a portion of which is non-circular and the tube or fitting is distorted or upset to have a tight and sealing engagement therewith to prevent relative rotation between the tube or tubing and the fitting or body member.

Other objects of this invention include the provision of a pilot light harness which provides a new and improved rugged, metal-to-metal gastight seal between a pilot tube and a pilot tube manifold which provides a new and improved process for directly sealing a pilot tube manifold without press fitting; which provides a new and non-obvious article of manufacture and a method of producing the article with efficacious simplicity and at reduced cost.

A still further object of this invention is to provide a structure obtaining one or more of the objects and advantages set forth above.

These and other objects and advantages of this invention will appear from the following description of preferred forms thereof, reference being had to the accompanying drawings.

For clarity of presentation, flashing from the clamping die juncture is omitted from the drawings.

DESCRIPTION OF THE PREFERRED EMBODIMENTS

This invention is useful, inter alia, in gas cooking stoves, and the like, and comprises a new and improved pilot light harness for one or more gas pilot lights, and the like, including a new and improved direct metal-to-metal gastight sealing bed which is resistant to seal rupture due to normally expected bending and torquing of the pilot tubes.

A pilot light harness embodying a preferred form of this invention is adapted for use on a conventional gas stove having a gas supply line terminating in a conventional main manifold from which a plurality of branched, feed or supply lines lead to burners which are situated in openings in the stove top. Gas flows through a supply lines to a burner when a valve is opened and the gas is lighted by the flow of a pilot light. The pilot light is supplied with gas through a pilot tube which is normally maintained in open gas communication with a pilot tube manifold or distributor, usually in combination with a filter. The entire pilot light apparatus, including the pilot tube manifold, the pilot light tubes, and the housing for the pilot light flame, is conventionally known as the harness.

All of the above is old and, per se, forms no part of the present invention.

Figure 1:
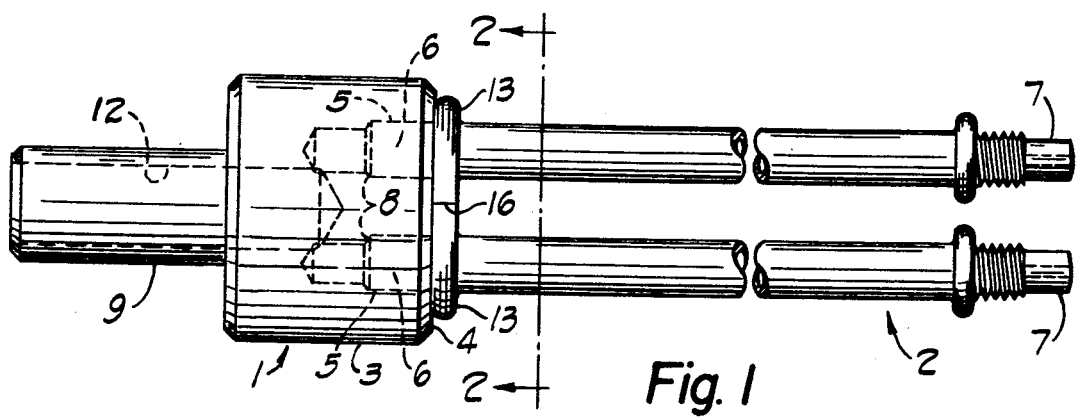
FIG. 1 is a plan view of a pilot light harness showing two pilot tubes sealed near their ends in a pilot tube manifold, with portions of the pilot tubes broken away.

Referring now to FIG. 1 which illustrates one particular embodiment of this invention, there is indicated a pilot tube manifold, designated generally at 1, and elongated pilot tubes indicated generally at 2, which are assembled as will be described hereinafter. The manifold includes a body 3 having an upper surface 4 and is provided with recesses 5 which extend into the body from the upper surface, and are generally perpendicular thereto. One end 6 of each pilot tube is inserted into each recess 5. The other end 7 of each pilot tube 2 is adapted to secure a pilot light fitting as will be described hereinafter.

Since a pilot tube 2 is generally cylindrical, each recess is a corresponding cylindrical passage having a diameter slightly larger than the diameter of the end 6 of the pilot tube to permit the end 6 to be slidably inserted in the recess 5. The diameter of the recess is necessarily greater than the outside diameter of the pilot tube to permit easy insertion of the end 6 with a sliding fit. The pilot tube 2 is preferably any suitable workable metal tube of relatively small diameter, such as ⅛-inch aluminum tubing having a wall thickness of about 0.035-inch, and the diameter of a recess is slightly greater, typically about 0.135-inch. Each recess 5 is provided with a stop means, such as a radially inwardly extending internal shoulder 8, at a predetermined depth from the surface 4, against which stop means the end 6 of an inserted pilot tube is abutted. The depth of the stop means is not critical and is typically about the same dimension as the nominal diameter of the pilot tube.

The body 3 of the manifold is provided with a stem portion or conduit 9, oppositely disposed from the upper surface 4. The stem portion 9 has an axial bore 12 which extends into the body 3 of the manifold and intersects the recesses 5 which are thus placed in open flow communication with the axial bore 12 through which gas is supplied to the pilot tubes. Since flow of gas through each pilot tube is mainly determined by the cross-sectional area of the intersection of each recess 5 with the axial bore 12, the area of the intersections are preferably maintained as nearly equal as possible.

Figure 2:
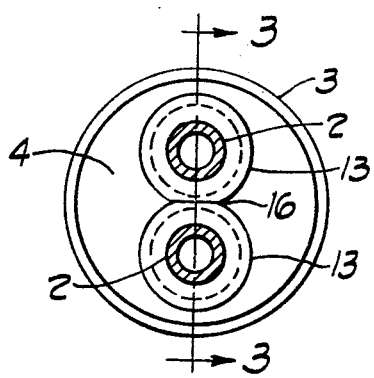
FIG. 2 is a side elevation view of the pilot light harness including a vertical section along the line 2—2 in FIG. 1.
Figure 3:
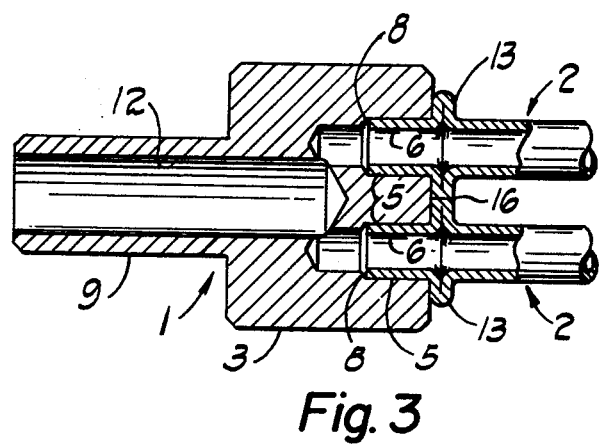
FIG. 3 is a partial vertical section of the pilot harness along the line 3—3 in FIG. 2.

In this preferred embodiment of the invention, the recesses 5 are proximately disposed in parallel spaced apart relationship with each other. Thus, the longitudinal axes of the end portions of the pilot tubes 2, inserted in the recess, are maintained in parallel, spaced apart relationship as shown in FIG. 2. After the ends of the pilot tubes 2 are inserted in the recesses 5, a sealing bead 13 is formed circumferentially on each pilot tube, the sealing bead 13 being in direct metal-to-metal contact with the upper surfaces 4. The sealing bead is a circumferentially enlarged portion of the outer surface of the tube and overlies the periphery of the recess 5 at the upper surface 4 in gastight sealing relationship therewith as shown in FIG. 3. The sealing bead 13 has an unbroken outer surface with no jagged ends, or a break, such as is characteristic of a sealing bead formed by an interference fit between the outer surface of a pilot tube and the wall of a recess.

Figure 4:
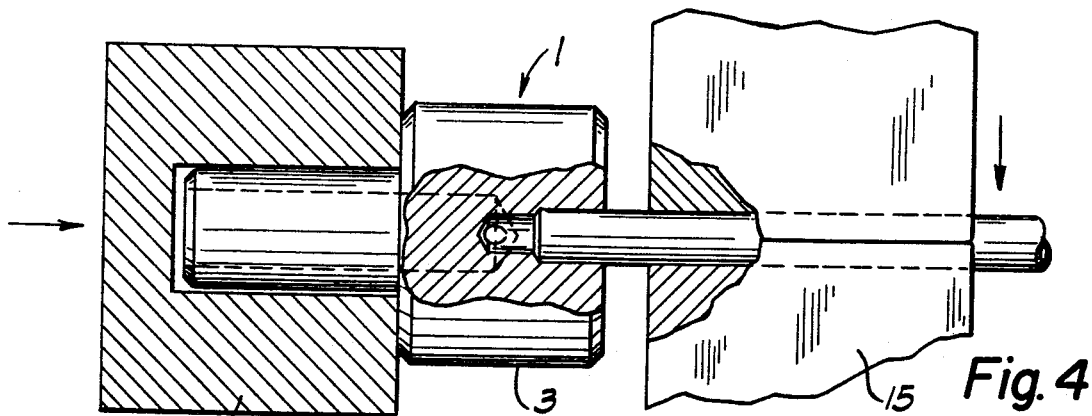
FIG. 4 is a front elevation view, partly in section, along line 4—4 in FIG. 3, of a pilot harness showing the front pilot tube of FIG. 3 in a clamping die.

Referring now to FIG. 4, the sealing bead 13 is formed by supporting the body 3 of the manifold in a suitable support block or die 14. Pilot tubes 2 protrude from recesses 5 in which ends 6 of the pilot tubes are slidingly disposed, resting against the internal shoulders 8. The pilot tubes 2 are clampingly supported, intermediate their ends, and near the surface 4, in a clamping die means 15 adapted to circumferentially, removably secure both pilot tubes simultaneously.

The clamping die is of conventional design and typically includes a split die with grooves having a diameter corresponding to the outside diameter of the pilot tubes. The precise distance from the surface at which the pilot tubes are clamped depends on several factors including the diameter of the tubes, the characteristics of the metal from which the tubes are fabricated, the dimensions of the sealing bead desired, and the like. For example, utilizing ⅛-inch aluminum tubes with 0.035-inch wall, the edge of the clamping die nearest the upper surface 4 is preferably about ⅛-inch from the upper surface.

The support block 14 for the body 3, and the clamping die 15 for the pilot tubes, are adapted for relative movement with respect to each other, along the longitudinal axis, for a predetermined distance so chosen as to form a sealing bead of desired size. In operation, the pilot tubes are placed in the lower portion of the open die and the body 3 inserted in the support block 14. The upper portion of the clamping die is then actuated to securely clamp both tubes circumferentially. Movement of support block 14 toward the clamping die 15 is then effected causing axial compression of the pilot tubes between the internal shoulders 8 and the clamping die 15, and forcing the ends 6 of the pilot tubes against the internal shoulders 8; and continued movement of the support block 14 forcibly causes the end portions of the walls of the pilot tubes within the recesses 5, to be distended against the walls of the recesses in gastight relationship therewith. Further, continued movement of the support block 14 forces flow of each pilot tube wall around the periphery of each recess 5, and in direct metal-to-metal contact with the upper surface 4 immediately around each recess. The resulting circumferential enlargement of the tube is the sealing bead 13 which is overlaid upon the upper surface 4, and provides a gastight seal between the outer surface of the pilot tube and the wall of the recess 5.

The method described immediately hereinabove provides a simple and efficacious gastight seal which is doubly secure by virtue of the sealing relationship of, first, the end portion of a pilot tube with the recess of the pilot tube manifold, or fitting, and then again, by the sealing bead around the periphery of the recess.

Occasionally, because of rough handling, a sufficient rotational torque may be exerted on a pilot tube to disrupt the seal with the pilot tube manifold. To prevent breaking the seal, and to resist the effect of rotational torque, the pilot tubes 2 are disposed in the recesses 5, sufficiently close to each other, to effect a tangential contact 16 (See FIG. 2) between the sealing beads 13, thus forming an interlock. Typically, ⅛-inch aluminum tubes having a 0.35-inch wall are disposed in recesses spaced about ⅛-inch apart.

Figure 5:
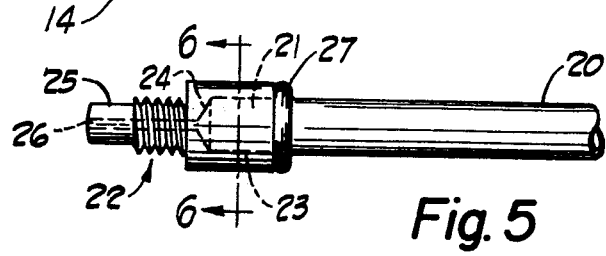
FIG. 5 is an elevation of a pilot tube, sealed near one end in a fitting.

In another embodiment of this invention, there is illustrated in FIG. 5 a pilot tube 20, one end 21 of which is slidingly inserted in a fitting, indicated generally at 22, having a recess 23 slightly larger in diameter than the outside diameter of the end 21 of the pilot tube 20. The recess 23 is provided with a stop means, such as a chamfer 24, to limit the travel of the end 21 when it is inserted in the recess 23. The fitting 22 may be of any suitable structure, and may have an externally threaded stem portion 25 having an axial bore 26 in open communication with the recess 23. It will be apparent that, depending upon the relative dimensions of the stem portion in comparison with the remainder of the fitting, the axes of the bore 26 and the pilot tube 20, may be non-aligned. It will be equally apparent that, a small fitting illustrated in FIG. 5, such as is used to secure a pilot light housing by threadedly disposing it snugly against the sheet metal in a stove top, will conveniently have the aforementioned axes aligned. The threads of the fitting, although shown in FIG. 5 disposed in longitudinal relationship with recess 23 may be formed on the surface of the fitting, radially outwardly of the recess 23, depending on the relative sizes of the tube and fitting and the purpose and use of the fitting, as at 30 in FIG. 6.

A gastight sealing bead 27 is formed on the pilot tube 20 in a manner analogous to that described hereinbefore, for a pilot tube manifold in which the ends of two pilot tubes are sealed. The fitting 22 with the pilot tube slidingly inserted therein, is held in a support block and moved longitudinally axially against the end 21 of the pilot tube 20 which is secured in a clamping means. Movement of the support block is continued until a sealing bead of desired size is formed, whereupon the movement is terminated, the support block retracted, and the pilot tube unclamped.

Figure 6:
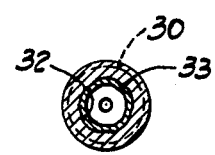
FIG. 6 is a side elevation section view along the line 6—6 in FIG. 5, showing other preferred embodiments of the invention.

A further embodiment of this invention useful in fittings and manifolds adapted to receive single or multiple tubes is illustrated in FIG. 6 which is a vertical section taken as though along the line 6—6 in FIG. 5. The fitting 22, shown with threads 30 exteriorly disposed on the body of the fitting, is provided with an irregular recess 32 such as may be formed by drilling a cylindrical hole and broaching it to provide an irregular surface, or by inserting a wobbling tool to yield an out-of-round hole. The particular means for providing the irregular recess or hole is unimportant as long as the wall of the recess has an undulating bumpy or rough surface. As described for other embodiments hereinbefore, a cylindrical pilot tube is slidingly thrust into the recess 32, the fitting 22 is secured in a support block and moved longitudinally axially against the end 21 of the pilot tube 20 which is secured in a clamping means. The end of the pilot tube is deformed and the surface of the tube within the recess 32 is forced to conform to the irregularities of the recess, as indicated at 33, thus locking the pilot tube within the recess against rotational movement relative to the wall of the recess. This locking of the pilot tube is important because the length of a pilot tube can serve to generate great leverage and torque which must be resisted to effect a reliable and rugged gastight seal.

It will be apparent that irregularity of only a portion of the recess 32 will suffice to provide a locking effect. Thus, a bumpy or distorted portion of the recess extending to some distance intermediate the counterbore or stop means for the pilot tube and the periphery of the recess will effectively lock the tube in place. It will also be evident that the use of and irregular recess to provide this locking action is not limited to a single pilot tube in a fitting and may be used when plural pilot tubes are to be sealingly disposed in a manifold. The locking action provided in such an embodiment will serve to reinforce the interlocking action of contiguous sealing beads. Alternatively, where it is inconvenient or undesirable to provide interlocking sealing beads, the locking action provided by irregular recesses may provide a sufficiently effective and rugged gastight seal.

Though it will be recognized, in each of the preferred embodiments hereinbefore described, that a pilot tube is slidingly inserted into a recess, and a circumferential bead formed to enhance the gastight seal effected by circumferential enlargement of the end of the pilot tube, it is also possible to press-fit the pilot tube into the recess and thereafter form the circumferential bead to enhance the effectiveness of the gastight seal to whatever extent it may do so.

Figure 7:
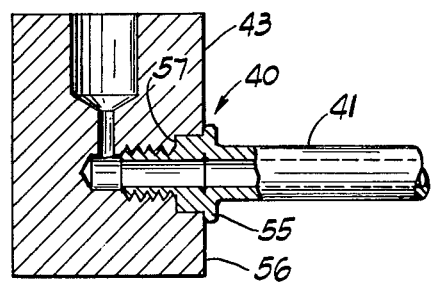
FIG. 7 is a vertical section of a tube and fitting juncture embodying another preferred form of this invention.

Another form of the invention is indicated generally at 40 in FIG. 7. In this instance, a tube or tubular member 41 is shown within a fitting or body member 43 which, as shown, is also useful in a pilot light harness for gas stoves, and the like.

However, as with the other preferred embodiments of this invention, different tubes may be joined with different body members, in a plug and socket relationship, in accordance with one or more of the preferred embodiments of this invention for any desired purpose within the concepts hereof.

The form of the invention disclosed in FIG. 7 is especially useful for such junctures or assemblies which are to not only seal and be gas or fluidtight, but are also to have great resistance to loosening or loss of seal due either to torque or axially applied forces, such as pulling. In fact, the juncture or assembly 40, in its preferred form, withstands loosening under forces which would destruct the tube.

It is a further feature of the embodiments of this invention to be hereinafter more fully described, that the natural aging or annealing process, which tends to exist in environments common to those situations where such junctures or assemblies might be used, especially when temperatures thereat rise and fall periodically, or on a regular basis relative to ordinary room temperature.

Figure 9:
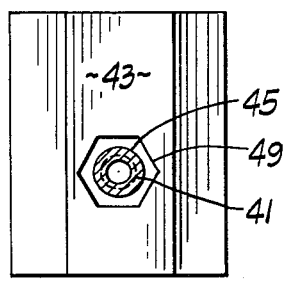
FIG. 9 is a sectional view, viewed along the line 9—9, of FIG. 8.

To this end, in forming the juncture 40, includes a bore, recess or other suitable aperture 45 formed in the fitting or body member 43 and provided with internal threads 46, spaced from the open end 48 thereof. Bore 45 also includes, at some place along the length thereof, intermediate the threads 46 and end 48, a portion 49, which is non-circular in cross-section, and of greater internal diameter than the external diameter of the tube to be disposed therein. Conveniently, such non-circular portion 49 may be hex-shaped as shown in FIG. 9, but, alternatively, portion 49 may take any convenient shape, such as square, rectangular, or as discussed in connection with FIG. 6 above. Also, conveniently, the non-circular portion 49 is immediately adjacent the open end 48 of the bore 45 for ease of formation, as by broaching, but this, too, may be varied in accordance with the desires, needs or convenience of the user or the particular use to which the juncture is to be put. Bore 45 is conveniently formed by drilling the fitting or body member and then tapping to form the threads.

As noted above, juncture 40 also includes a tube or tubular member 41. In this form of the invention, the end 51 of tube 41 is threaded externally, as at 53, FIG. 8, complementary to the threads 46. Thus, tube 41 and fitting 43 may be threadably engaged together in the first instance, and such engagement, ab initio, and after completion in accordance with the teachings hereof, prevents and resists displacement of the tube into or out of the fitting because of an axial (relative to the axis of the tube and juncture) force exerted on the tube, fitting or both, especially in tension.

After the tube 41 is threadably engaged within the bore 45, an axial force or pressure in compression is exerted on the tube 41, with the interengagement between the threads 46 and 53 functioning in the manner of an abutment to prevent movement (i.e., axial displacement) of the tube end 51. The pressure or force on the tube 41 thus upsets and cold flows the tube metal so as to fill all the interstices between the threads 46 and 53 and all of the space within the bore 45, including that at the non-circular portion 49 of the bore, and to form a bead or flange 55 (FIG. 7) against the fitting surface 56 and about the bore opening 48. Bead or flange 55 is, in all respects, similar to the beads 13 and 27 heretofore described.

Figure 8:
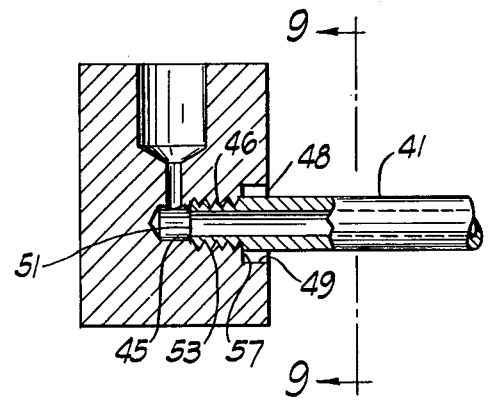
FIG. 8 is a view, similar to FIG. 7, with the tube disposed in the fitting, but before upsetting thereof.

The upsetting and flow of metal in the tube 41, as just described, not only induces stress therein, but also creates an intimate engagement and gas and fluidtight seal between the tube 41 and fitting 43 at the threads, at the shoulder 57, when the bore 45 is so provided, FIGS. 7 and 8, between the fitting 43 and the tube 41 in the non-circular portion 49 and between the tube and fitting surface 56 at the flange 55 and about the periphery of the open end 48 of the bore 45.

In this connection, it is noted that the said engagement between the tube 41 and fitting 43 at the non-circular portion 49 of the bore 45, prevents relative rotational movement between the fitting and tube because of any force applied to torque to one or the other, or both. The completed sealing engagement between the threads 46 and 53 prevents any relative movement axially between the fitting and tube. Thus, the completed seal prevents any relative displacement between tube and fitting which would break or interfere with the seal effected by the upsetting and deformation as set forth herein.

Further, the juncture 40 tends to improve its sealing characteristics with time, during use in the normal anticipated environment, because the changing temperatures, as adjacent a pilot light, or otherwise experienced in use, tend to anneal or age the metal, worked and thereby stressed during upsetting, and return the same to a normal condition and, it is believed, that such effect improves the seal effected by said juncture to further aid in obtaining the objects and advantages of this invention.

Figure 10:
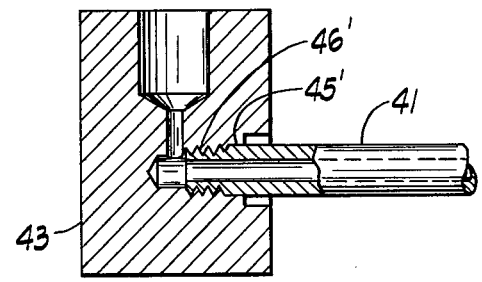
FIG. 10 is a view, similar to FIG. 8, of another form of the invention shown in FIG. 7.

In the form of the invention shown in FIG. 10, the juncture is similar to that shown in FIGS. 7 and 8, except that the threads 46' within the bore 45', do not meet the shoulder 48. Similarly, the threads on the tube could be spaced inwardly from the tip or end 51 thereof, it being sufficient only that there be threads on both the fitting and tube which can engage to function as set forth herein as an abutment for upsetting and to prevent, relative axial movement or displacement after completion of the juncture.

Figure 11:
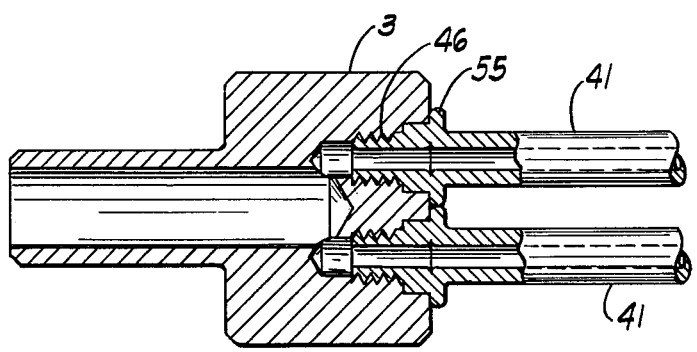
FIG. 11 is a view, otherwise similar to FIG. 3, showing the form of the invention in FIG. 7.

FIG. 11, in which like reference characters refer to like parts, as in FIGS. 1–10, inclusive, illustrates that the form of the invention shown in FIGS. 7–10, inclusive, can be used in the same environment situation, as in FIG. 3, with the similar result that the interlocking beads or flanges prevent relative movement in response to torque. In such instance, the non-circular portion may be incorporated in the juncture, as shown, for greater resistance or deleted as desired.

By way of example, a juncture comprising an aluminum fitting having a bore with a 40-pitch thread of 15 thousandths depth and ⅛-inch aluminum tubing with an 0.035 wall and similar threads made in accordance with and embodying the structure of this invention resists relative axially movement when subjected to a 400-lb. hydrauic pull. And the non-circular portion, shown by way of example in FIGS. 7–9, inclusive, provides sufficient resistance against forces in torque that the tube can fail and tear in response thereto, before relative rotational movement between the tube and fitting is effected in the juncture.

Modifications, changes and improvements to the preferred forms of the invention herein disclosed, described and illustrated may occur to those skilled in the art who come to understand the principals and precepts thereof. Accordingly, the scope of the patent to be issued herein should not be limited to the particular embodiments of the invention set forth herein, but rather should be limited by the advance by which the invention has promoted the art.

What is claimed is:

1. A process for forming a fluid seal between a tube means having an end and a wall, and a fitting means having an external surface, said process comprising the steps of forming a bore in said fitting means, said bore having an internal wall, an opening in said external surface and internal threads in said internal wall and spaced from said opening; threading said wall of said tube means externally, adjacent said end and complementary to said bore threads; threadably engaging said tube means threads and bore threads; and exerting an axial force on said tube means to upset and flow said wall of said tube means into sealing engagement with said internal wall of said bore and into forming an integral, external flange on said tube means wall in sealing engagement with said external surface of said fitting means surrounding said bore opening.

2. The process according to claim 1 with the additional steps, prior to upsetting said tube means wall, of removably securing said fitting means in a support means, and clamping said wall of said tube means externally, in spaced relation with said fitting means external surface, whereby said upsetting is accomplished by relative displacement of said fitting and tube means axially toward each other.

3. The process of claim 2 including the step of forming said interior wall of said bore intermediate said bore threads and said bore opening with a portion having a non-circular cross-section, before threadably engaging said tube means threads and bore threads.

4. A process for forming a fluid seal between a tube means having an end and a wall, and a fitting means having an external surface, said process comprising the steps of forming a bore in said fitting means, said bore having an internal wall, an opening in said external surface and internal threads in said internal wall and spaced from said opening; threading said wall of said tube means externally adjacent said end and complementary to said bore threads; forming said interior wall of said bore intermediate said bore threads and said bore opening with a portion having a non-circular cross-section, threadably engaging said tube means threads and bore threads; and upsetting and flowing said wall of said tube means into sealing engagement with said internal wall and threads of said bore and into forming an integral external flange on said tube means wall in sealing engagement with said external surface of said fitting means surrounding said bore opening.

5. The process according to claim 4 with the additional steps, prior to upsetting said tube means wall, of removably securing said fitting means in a support means, and clamping said wall of said tube means externally, in spaced relation with said fitting means external surface, whereby said upsetting is accomplished by relative displacement of said fitting and tube means axially toward each other.

* * * * *